US010365396B2

(12) United States Patent
Jimenez, Jr. et al.

(10) Patent No.: US 10,365,396 B2
(45) Date of Patent: Jul. 30, 2019

(54) THREE-DIMENSIONAL RADIOGRAPH SECURITY SYSTEM

(71) Applicant: Sandia Corporation, Albuquerque, NM (US)

(72) Inventors: Edward Steven Jimenez, Jr., Albuquerque, NM (US); Tod Tracy Amon, Sandia Park, NM (US); Kyle R. Thompson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 240 days.

(21) Appl. No.: 15/279,969

(22) Filed: Sep. 29, 2016

(65) Prior Publication Data
US 2018/0088250 A1 Mar. 29, 2018

(51) Int. Cl.
*G01V 5/00* (2006.01)
(52) U.S. Cl.
CPC .................. *G01V 5/0058* (2013.01)
(58) Field of Classification Search
CPC ............................ G01V 5/0058; G01N 23/04
USPC ............................................. 378/41, 57, 62
See application file for complete search history.

(56) References Cited

U.S. PATENT DOCUMENTS

| 2004/0062346 A1* | 4/2004 | Fernandez | G01V 5/0058 378/41 |
| 2010/0046704 A1* | 2/2010 | Song | G01N 23/04 378/57 |
| 2013/0343515 A1* | 12/2013 | Besson | G01N 23/04 378/16 |

* cited by examiner

*Primary Examiner* — Courtney D Thomas
(74) *Attorney, Agent, or Firm* — Yee & Associates, P.C.

(57) ABSTRACT

A method and apparatus for displaying a three-dimensional radiograph in a security scanner. A first X-ray image of an object is generated by the security scanner from a first viewpoint. A second X-ray image of the object is generated by the security scanner from a second viewpoint. The first X-ray image and the second X-ray image form a stereogram. The stereogram is displayed by the security scanner on a display system for the security scanner such that a first eye of a viewer sees the first X-ray image in the stereogram and a second eye of the viewer sees the second X-ray image in the stereogram. A parallax between the first viewpoint and the second viewpoint in the stereogram results in a three-dimensional visualization of the object on the display system for the security scanner.

17 Claims, 5 Drawing Sheets

THREE-DIMENSIONAL RADIOGRAPH SECURITY SYSTEM

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved security scanner and, in particular, to a method and apparatus for increased information provided by a security scanner. Still more particularly, the present disclosure relates to a method and apparatus for displaying a three-dimensional radiograph in the security scanner.

2. Background

Generating X-ray images of objects is a common practice for different diagnostic and inspection applications. This type of technique is currently used in security scanners at locations such as an airport or a stadium. An X-ray source is directed towards an object. Many of the X-rays pass through the object with others being attenuated or scattered by the object. The X-rays passing through the object are detected by a detector. An image is generated using the X-rays detected. This image is a two-dimensional image of the internal structure of the object. For example, an X-ray source directed at an object in the form of a bag will result in an image of the contents of the bag.

A person viewing the two-dimensional image may not obtain as much information as desired about the contents of the bag. Often times, the two-dimensional image does not provide as much information as desired to identify objects. As a result, other types of inspections such as searching bags for objects may be performed.

These additional searches, however, may take more time and effort than desired when checking people through checkpoints in an airport or some other location. Further, the additional searches also may be undesirable from a customer service standpoint.

Therefore, it would be desirable to have a method and apparatus that take into account at least some of the issues discussed above, as well as other possible issues. For example, it would be desirable to have a method and apparatus that overcome a technical problem with increasing the amount of information that a viewer may obtain from an X-ray image of an object.

SUMMARY

An embodiment of the present disclosure provides a method for displaying a three-dimensional radiograph in a security scanner. A first X-ray image of an object is generated by the security scanner from a first viewpoint. A second X-ray image of the object is generated by the security scanner from a second viewpoint. The first X-ray image and the second X-ray image form a stereogram. The stereogram is displayed by the security scanner on a display system for the security scanner such that a first eye of a viewer sees the first X-ray image in the stereogram and a second eye of the viewer sees the second X-ray image in the stereogram. A parallax between the first viewpoint and the second viewpoint in the stereogram results in a three-dimensional visualization of the object on the display system for the security scanner.

Another embodiment of the present disclosure provides a security scanner. The security scanner comprises a display system and a controller in communication with the display system. The controller is configured to control an X-ray source and a sensor system to generate a first X-ray image of an object from a first viewpoint. Also, the controller is configured to control the X-ray source and the sensor system to generate a second X-ray image of the object from a second viewpoint in which the first X-ray image and the second X-ray image form a stereogram. Yet also, the controller is configured to display the stereogram on the display system for the security scanner such that a first eye of a viewer sees the first X-ray image in the stereogram and a second eye of the viewer sees the second X-ray image in the stereogram. A parallax between the first viewpoint and the second viewpoint in the stereogram results in a three-dimensional visualization of the object on the display system for the security scanner.

Yet another embodiment of the present disclosure provides a three-dimensional security scanner. The three-dimensional security scanner comprises an X-ray source configured to emit X-rays toward an object, a display system, and a controller in communication with the X-ray source, sensor system, and display system. The controller is configured to control the X-ray source and the sensor system to generate a first X-ray image of an object from a first viewpoint. Also, the controller is configured control the X-ray source and the sensor system to generate a second X-ray image of the object from a second viewpoint in which the first X-ray image and the second X-ray image form a stereogram. Yet also, the controller is configured to display the stereogram on the display system for the three-dimensional security scanner such that a first eye of a viewer sees the first X-ray image in the stereogram and a second eye of the viewer sees the second X-ray image in the stereogram. A parallax between the first viewpoint and the second viewpoint in the stereogram results in a three-dimensional visualization of the object on the display system for the three-dimensional security scanner.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that two-dimensional images do not provide as much information as three-dimensional images. For example, X-ray images from a scan of an object may be processed to form a computed tomography scan. This type of scan involves taking many X-ray images from different angles to produce cross-sectional images of a scanned object.

The volume of data with this type of imaging is very large as compared to the amount of data present in a single X-ray image. As a result, the processing resources needed to create the computed tomography scan are much greater than those normally used for viewing X-ray images in a security scanner. Further, the processing time is often much greater than desired for performing security scans at a checkpoint using the security scanner.

Thus, the illustrative embodiments provide a method and apparatus for displaying a three-dimensional radiograph in a security scanner. In one illustrative example, the security scanner is a hardware system and generates a first X-ray image of an object from a first viewpoint. The security scanner generates a second image of the object from a second viewpoint, wherein the first X-ray image and the second X-ray image form a stereogram. The security scanner displays the stereogram on the display system for the security scanner such that a first eye of a viewer sees the first X-ray image in the stereogram and a second eye of the viewer sees the second X-ray image in the stereogram. A parallax between the first viewpoint and the second viewpoint in the stereogram results in a three-dimensional visualization of the object on the display system for the security scanner.

Figure 1:
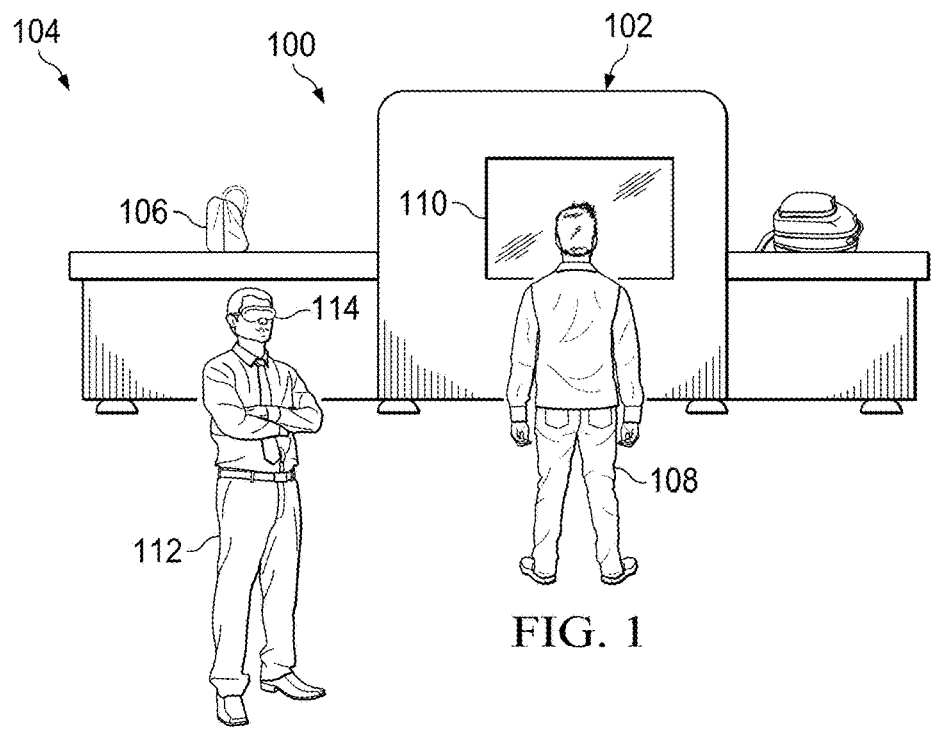
FIG. 1 is an illustration of a security environment in accordance with an illustrative embodiment.

With reference now to the figures and, in particular, with reference to FIG. 1, an illustration of a security environment is depicted in accordance with an illustrative embodiment. In this example, security environment 100 includes security scanner 102 located in airport 104. Security scanner 102 operates to scan objects such as bag 106.

As depicted, bag 106 moves through security scanner 102, which generates X-ray images of bag 106 from two or more viewpoints. These images are processed to form a three-dimensional visualization of bag 106 in the form of a stereogram that is displayed in a display system for viewing. In this example, person 108 views the three-dimensional visualization of bag 106 on display screen 110 and person 112 views the three-dimensional visualization of bag 106 on head-mounted display 114.

This three-dimensional visualization allows person 108 and person 112 to perceive more information about bag 106 than with viewing a two-dimensional X-ray image of bag 106. For example, information such as depth and distance may be perceived through the three-dimensional visualization in a stereogram which is not received with the two-dimensional X-ray.

Further, security scanner 102 also may generate an alert if bag 106 is identified as a prohibited object. The alert may be selected from at least one of a visual alert, an audible alert, or some other suitable type of alert. In this manner, at least one person, person 108 or person 112, may more carefully view objects inside of bag 106, physically inspect bag 106, or some combination thereof when the alert is generated.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
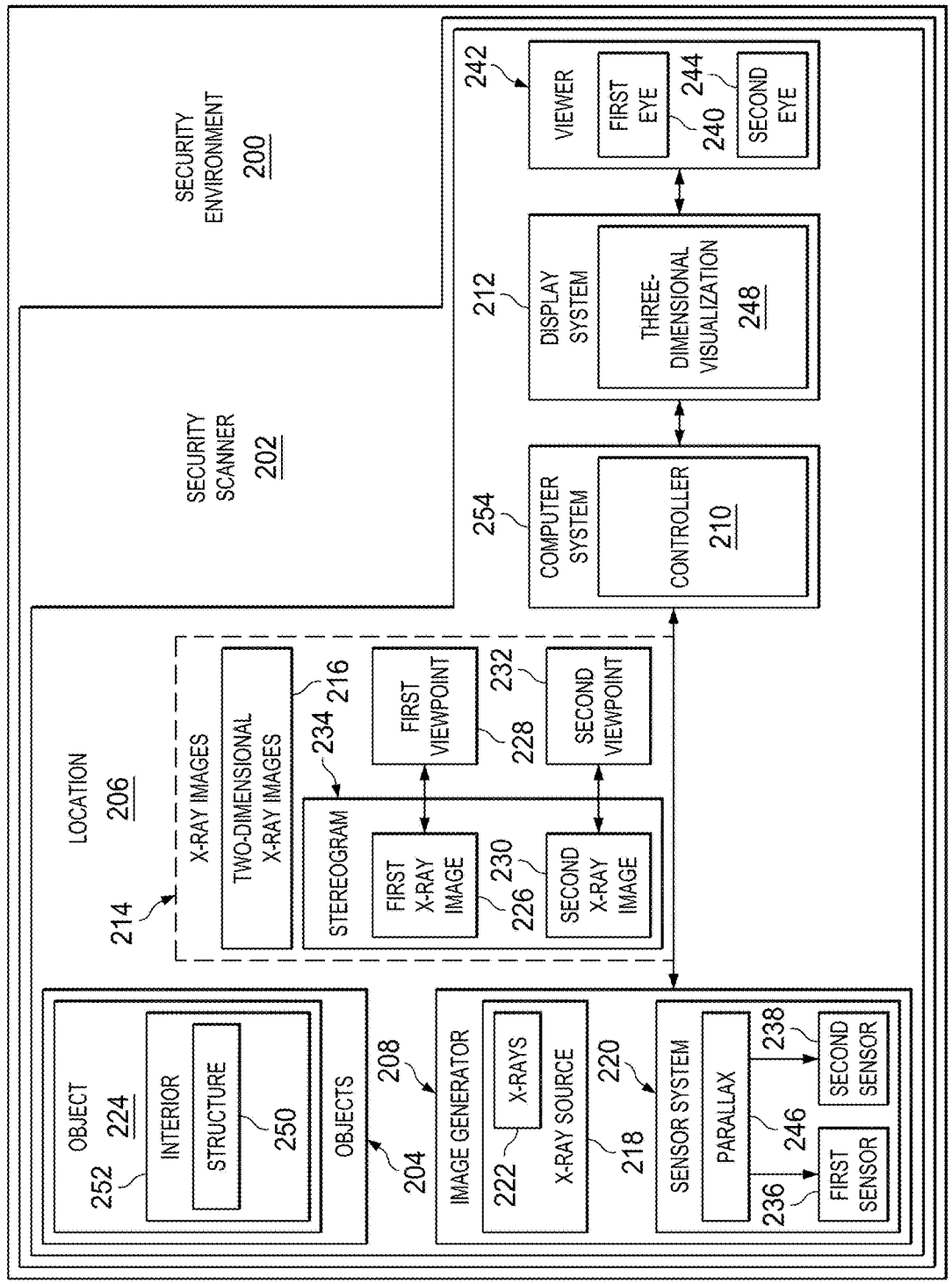
FIG. 2 is an illustration of a block diagram of a security environment in accordance with an illustrative embodiment.

With reference to FIG. 2, an illustration of a block diagram of a security environment is depicted in accordance with an illustrative embodiment. In this depicted example, security environment 100 in FIG. 1 is an example of one physical implementation for security environment 200 shown in this figure.

As depicted, security scanner 202 in security environment 200 is configured to scan objects 204. In this illustrative example, security scanner 202 is located in location 206 selected from one of an airport, a courthouse, a stadium, an office building, or some other location in which security scanning may be desired.

In this illustrative example, security scanner 202 includes a number of different components that operate to scan objects 204. As depicted, security scanner 202 comprises image generator 208, controller 210, and display system 212.

Image generator 208 generates X-ray images 214. In this depicted example, X-ray images 214 are two-dimensional X-ray images 216. Image generator 208 includes X-ray source 218 and sensor system 220. X-ray source 218 is configured to emit X-rays 222 towards object 224 in objects 204. Sensor system 220 is a detector that is configured to detect X-rays 222 passing through object 224 from X-ray source 218. Sensor system 220 generates X-ray images 214 in response to detecting X-rays 222.

In this illustrative example, controller 210 is in communication with display system 212, X-ray source 218, and sensor system 220. Controller 210 is configured to control X-ray source 218 and sensor system 220 to generate first X-ray image 226 of object 224 from first viewpoint 228; and control X-ray source 218 and sensor system 220 to generate second X-ray image 230 of object 224 from second viewpoint 232 in which first X-ray image 226 and second X-ray image 230 form stereogram 234. As depicted, first viewpoint 228 and second viewpoint 232 may be obtained through first sensor 236 and second sensor 238 in sensor system 220.

In this illustrative example, a viewpoint is a position of observation. For example, the viewpoint is a position in which a person may view an object. In the illustrative example, the position for the viewer is represented by a sensor within sensor system 220.

Further, controller 210 displays stereogram 234 on display system 212 for security scanner 202 such that first eye 240 of viewer 242 sees first X-ray image 226 in stereogram 234 and second eye 244 of viewer 242 sees second X-ray image 230 in stereogram 234, such that parallax 246 is present. As depicted, viewer 242 is a person inspecting object 224. In this example, parallax 246 between first viewpoint 228 and second viewpoint 232 in stereogram 234 results in three-dimensional visualization 248 of object 224 on display system 212 for security scanner 202. Parallax 246 is such that viewer 242 perceives information such as distance and depth in stereogram 234, which is not perceived by a two-dimensional X-ray image.

Display system 212 may take a number of different forms. For example, display system 212 is selected from at least one of a head-mounted display, video eyeglasses, a display screen, smartglasses, or some other suitable type of display system that is configured to display stereogram 234 to provide three-dimensional visualization 248.

In viewing three-dimensional visualization 248 of object 224 through stereogram 234 displayed on display system 212, structure 250 of interior 252 of object 224 is seen in stereogram 234. Further, a group of objects 204 may be located inside of object 224. This group of objects 204 may also be seen in stereogram 234 displayed on display system 212. In a different illustrative example, object 224 may be located inside of another object in objects 204.

Controller 210 may be implemented in software, hardware, firmware, or a combination thereof. When software is used, the operations performed by controller 210 may be implemented in program code configured to run on hardware, such as a processor unit. When firmware is used, the operations performed by controller 210 may be implemented in program code and data and stored in persistent memory to run on a processor unit. When hardware is employed, the hardware may include circuits that operate to perform the operations in controller 210.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, controller 210 may be implemented in computer system 254. Computer system 254 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Figure 3:
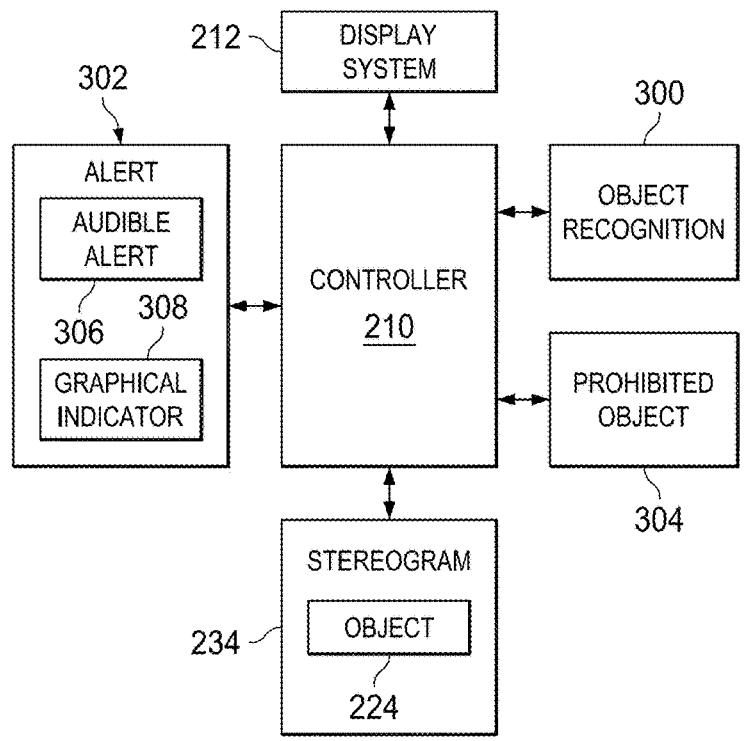
FIG. 3 is an illustration of a block diagram of a generation of an alert in accordance with an illustrative embodiment.

Turning now to FIG. 3, an illustration of a block diagram of a generation of an alert is depicted in accordance with an illustrative embodiment. In this illustrative example, controller 210 may also be configured to perform object recognition 300 on object 224 as seen in at least one of first X-ray image 226 or second X-ray image 230 in FIG. 2 in stereogram 234.

Object recognition 300 may be performed using any currently available type of object recognition process or technique. For example, object recognition 300 may be performed by comparing object 224 in stereogram 234 to a library of objects.

Controller 210 generates alert 302 when object 224 is identified as prohibited object 304. Alert 302 is selected from at least one of audible alert 306, graphical indicator 308, or some other suitable type of alert. Audible alert 306 may be presented through a sound generation device. For example, the sound generation device may be a speaker in display system 212.

When alert 302 is graphical indicator 308, graphical indicator 308 may be displayed on display system 212. For example, graphical indicator 308 may be displayed in association with object 224 in stereogram 234. By being displayed in association with object 224, graphical indicator 308 draws attention to object 224. Graphical indicator 308 may be selected from at least one of color, a line, flashing text, text, bolding, an icon, or some other suitable type of graphical indicator that may draw attention to the fact that prohibited object 304 is present.

In one illustrative example, one or more technical solutions are present that overcome a technical problem with increasing the amount of information that a viewer may obtain from an X-ray image of an object. As a result, one or more technical solutions may provide a technical effect of providing a three-dimensional visualization of the object. One or more of the technical solutions involve generating X-ray images with a parallax to form stereograms. The stereograms are displayed in a manner that provides the three-dimensional visualization of the object. In this manner, the viewer may obtain additional information not seen in two-dimensional X-ray images. For example, the viewer may see other information such as distance and depth.

As a result, computer system 254 in FIG. 2 operates as a special purpose computer system in which controller 210 in computer system 254 enables displaying a three-dimensional visualization of an object without needing the processing resources or time used with a computer tomography scan. In particular, controller 210 transforms computer system 254 into a special purpose computer system as compared to currently available general computer systems that do not have controller 210.

The illustration of security environment 200 and the different components in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 2, display system 212 may be located in a location remote to location 206 in some illustrative examples. The viewers at the remote locations may perform the inspection of objects 204.

Figure 4:
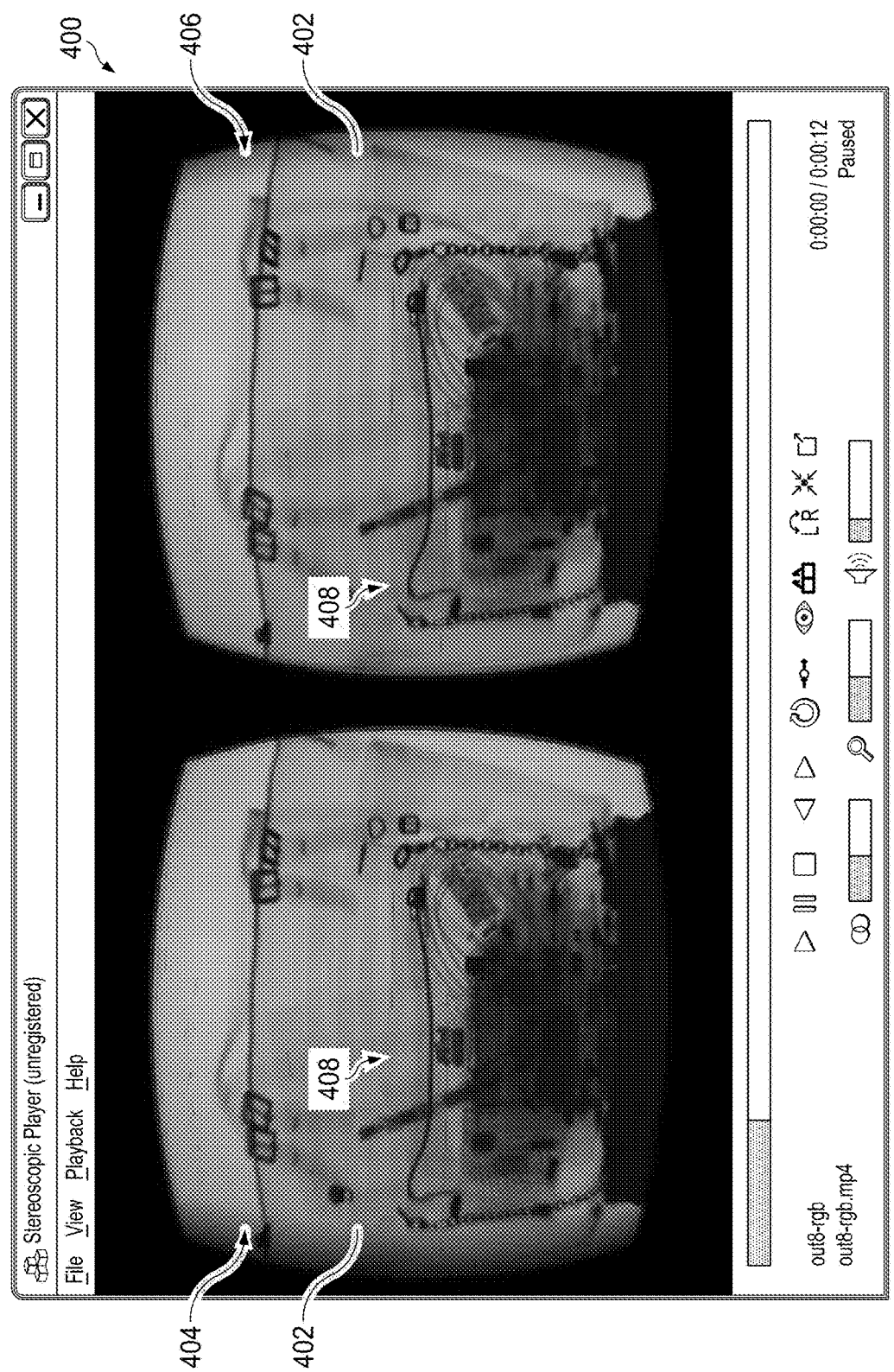
FIG. 4 is an illustration of a stereogram in accordance with an illustrative embodiment.

With reference now to FIG. 4, an illustration of a stereogram is depicted in accordance with an illustrative embodiment. In this illustrative example, stereogram 400 is an example of stereogram 234 shown in block form in FIG. 2. In this example, bag 402 with objects 408 are shown in first X-ray image 404 and second X-ray image 406 in stereogram 400.

As depicted, first X-ray image 404 and second X-ray image 406 may be displayed on the same screen of a single display device with at least one of a divider or some other mechanism that causes each eye for the viewers to only see one of the X-ray images. The display device may be, for example, a head-mounted display. First X-ray image 404 is taken from a first viewpoint while second X-ray image 406 is taken from a second viewpoint. The viewpoints are selected to be some number of degrees apart from each other such that information such as at least one of depth or distance may be perceived.

Figure 5:
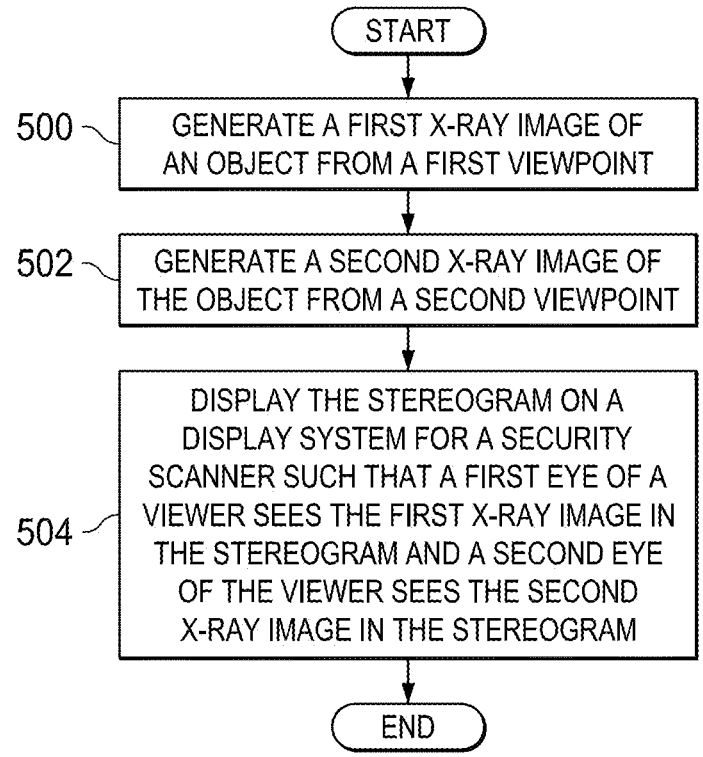
FIG. 5 is an illustration of a flowchart of a process for displaying a three-dimensional radiograph on a security scanner in accordance with an illustrative embodiment.

Turning next to FIG. 5, an illustration of a flowchart of a process for displaying a three-dimensional radiograph on a security scanner is depicted in accordance with an illustrative embodiment. The process illustrated in FIG. 5 may be implemented in security scanner 202 shown in block form in FIG. 2.

The process begins by generating a first X-ray image of an object from a first viewpoint (step 500). Next, the process generates a second X-ray image of the object from a second viewpoint (step 502). The first X-ray image and the second X-ray image form a stereogram.

The process then displays the stereogram on a display system for a security scanner such that a first eye of a viewer sees the first X-ray image in the stereogram and a second eye of the viewer sees the second X-ray image in the stereogram (step 504) with the process terminating thereafter. The first eye does not see the second X-ray image, and the second eye does not see the first X-ray image as displayed on the display system. A parallax between the first viewpoint and the second viewpoint in the stereogram displayed in step 504 results in a three-dimensional visualization of the object on the display system for the security scanner.

Figure 6:
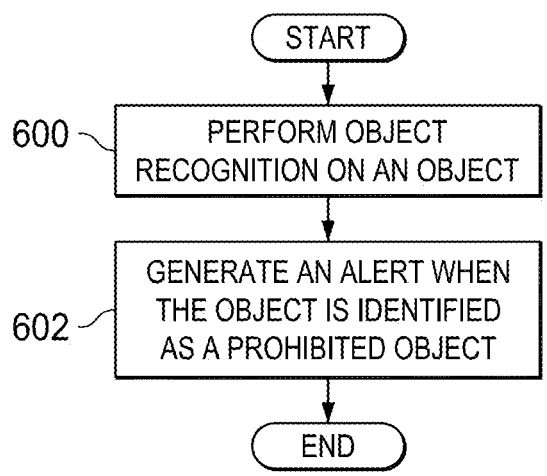
FIG. 6 is an illustration of a flowchart of a process for generating an alert in accordance with an illustrative embodiment.

With reference next to FIG. 6, an illustration of a flowchart of a process for generating an alert is depicted in accordance with an illustrative embodiment. The process illustrated in FIG. 6 may be implemented in security scanner 202 shown in block form in FIG. 2.

The process begins by performing object recognition on an object (step 600). The process then generates an alert when the object is identified as a prohibited object (step 602). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
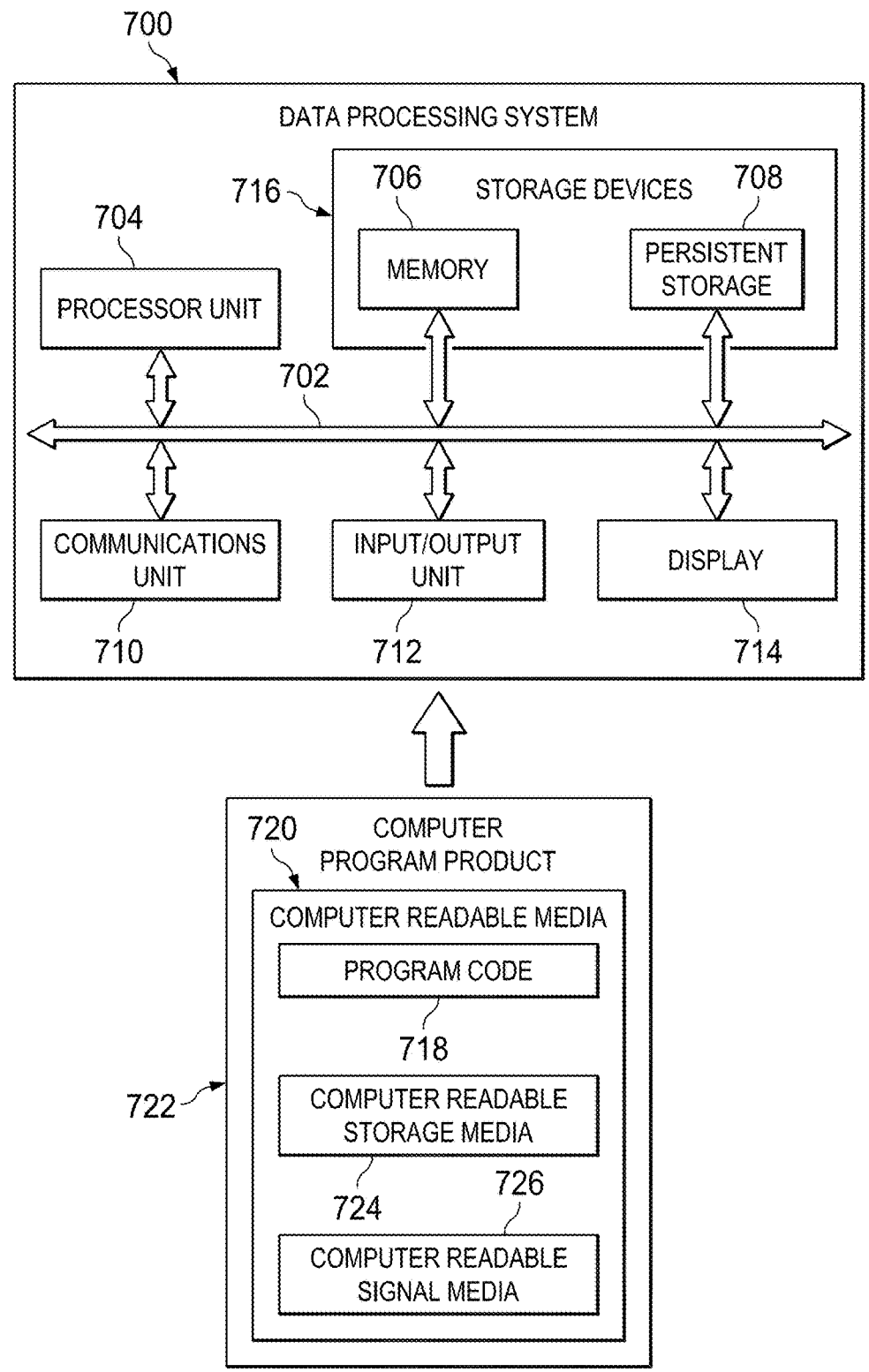
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement computer system 254 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a solid state hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718. Alternatively, program code 718 may be transferred to data processing system 700 using computer readable signal media 726. Computer readable signal media 726 may be, for example, a propagated data signal containing program code 718. For example, computer readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

Thus, the illustrative example overcomes a technical problem with increasing the amount of information that a viewer may obtain from an X-ray image of an object. As a result, one or more illustrative examples may provide a technical effect of providing a three-dimensional visualization of the object. One or more of the illustrative examples involve generating X-ray images with a parallax to form stereograms. The stereograms are displayed in a manner that provides the three-dimensional visualization of the object. In this manner, the viewer may obtain additional information not seen in two-dimensional X-ray images. For example, the viewer may see other information such as distance and depth.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying a three-dimensional radiograph in a security scanner, the method comprising:
   generating, by the security scanner, a first X-ray image of a plurality of objects from a first viewpoint;
   generating, by the security scanner, a second X-ray image of the plurality of objects from a second viewpoint, wherein the first X-ray image and the second X-ray image form a stereogram;
   displaying, by the security scanner, the stereogram on a display system for the security scanner such that a first eye of a viewer sees the first X-ray image in the stereogram and a second eye of the viewer sees the second X-ray image in the stereogram, wherein a parallax between the first viewpoint and the second viewpoint in the stereogram results in a three-dimensional visualization of an object of the plurality of objects on the display system for the security scanner;
   determining an area of interest in the stereogram unaided by an operator, the area of interest in the stereogram including the three-dimensional visualization of the object;
   performing object recognition on the object, the object located in the area of interest; and
   generating an alert when the object is identified as a prohibited object, wherein the alert comprises a graphical indicator displayed in association with the object to draw attention to the object.

2. The method of claim 1, wherein the alert further comprises an audible alert.

3. The method of claim 1, wherein a structure of an interior of the object is seen in the stereogram.

4. The method of claim 1, wherein a group of objects is located inside of the object.

5. The method of claim 1, wherein the object is located inside of another object.

6. The method of claim 1, wherein the display system is selected from at least one of a head-mounted display, video eyeglasses, a display screen, or smartglasses.

7. The method of claim 1, wherein the parallax is such that the viewer perceives distance and depth in the stereogram.

8. The method of claim 1, wherein the security scanner is located in a location selected from one of an airport, a courthouse, a stadium, and an office building.

9. A security scanner comprising:
   a display system; and
   a controller in communication with the display system, wherein the controller is configured to control an X-ray source and a sensor system to generate a first X-ray image of a plurality of objects from a first viewpoint; control the X-ray source and the sensor system to generate a second X-ray image of the plurality of objects from a second viewpoint in which the first X-ray image and the second X-ray image form a stereogram; display the stereogram on the display system for the security scanner such that a first eye of a viewer sees the first X-ray image in the stereogram and a second eye of the viewer sees the second X-ray image in the stereogram, wherein a parallax between the first viewpoint and the second viewpoint in the stereogram results in a three-dimensional visualization of an object of the plurality of objects on the display system for the security scanner; determine an area of interest in the stereogram unaided by an operator, the area of interest in the stereogram including the three-dimensional visualization of the object; perform object recognition on the object, the object located in the area of interest; and generate an alert when the object is identified as a prohibited object, wherein the alert comprises a graphical indicator displayed in association with the object to draw attention to the object.

10. The security scanner of claim 9, wherein the alert further comprises an audible alert.

11. The security scanner of claim 9, wherein a structure of an interior of the object is seen in the stereogram.

12. The security scanner of claim 9, wherein a group of objects is located inside of the object.

13. The security scanner of claim 9, wherein the object is located inside of another object.

14. The security scanner of claim 9, wherein the display system is selected from at least one of a head-mounted display, video eyeglasses, a display screen, or smartglasses.

15. The security scanner of claim 9, wherein the parallax is such that the viewer perceives distance and depth in the stereogram.

16. The security scanner of claim 9, wherein the security scanner is located in a location selected from one of an airport, a courthouse, a stadium, and an office building.

17. A three-dimensional security scanner comprising:
an X-ray source configured to emit X-rays toward a plurality of objects;
a sensor system configured to detect the X-rays;
a display system; and
a controller in communication with the X-ray source, sensor system, and display system, wherein the controller is configured to control the X-ray source and the sensor system to generate a first X-ray image of the plurality of objects from a first viewpoint; control the X-ray source and the sensor system to generate a second X-ray image of the plurality of objects from a second viewpoint in which the first X-ray image and the second X-ray image form a stereogram; display the stereogram on the display system for the three-dimensional security scanner such that a first eye of a viewer sees the first X-ray image in the stereogram and a second eye of the viewer sees the second X-ray image in the stereogram, wherein a parallax between the first viewpoint and the second viewpoint in the stereogram results in a three-dimensional visualization of an object of the plurality of objects on the display system for the three-dimensional security scanner; determining an area of interest in the stereogram unaided by an operator, the area of interest in the stereogram including the three-dimensional visualization of the object; perform object recognition on the object, the object located in the area of interest; and generate an alert when the object is identified as a prohibited object, wherein the alert comprises a graphical indicator displayed in association with the object to draw attention to the object.

* * * * *